Figure 1:
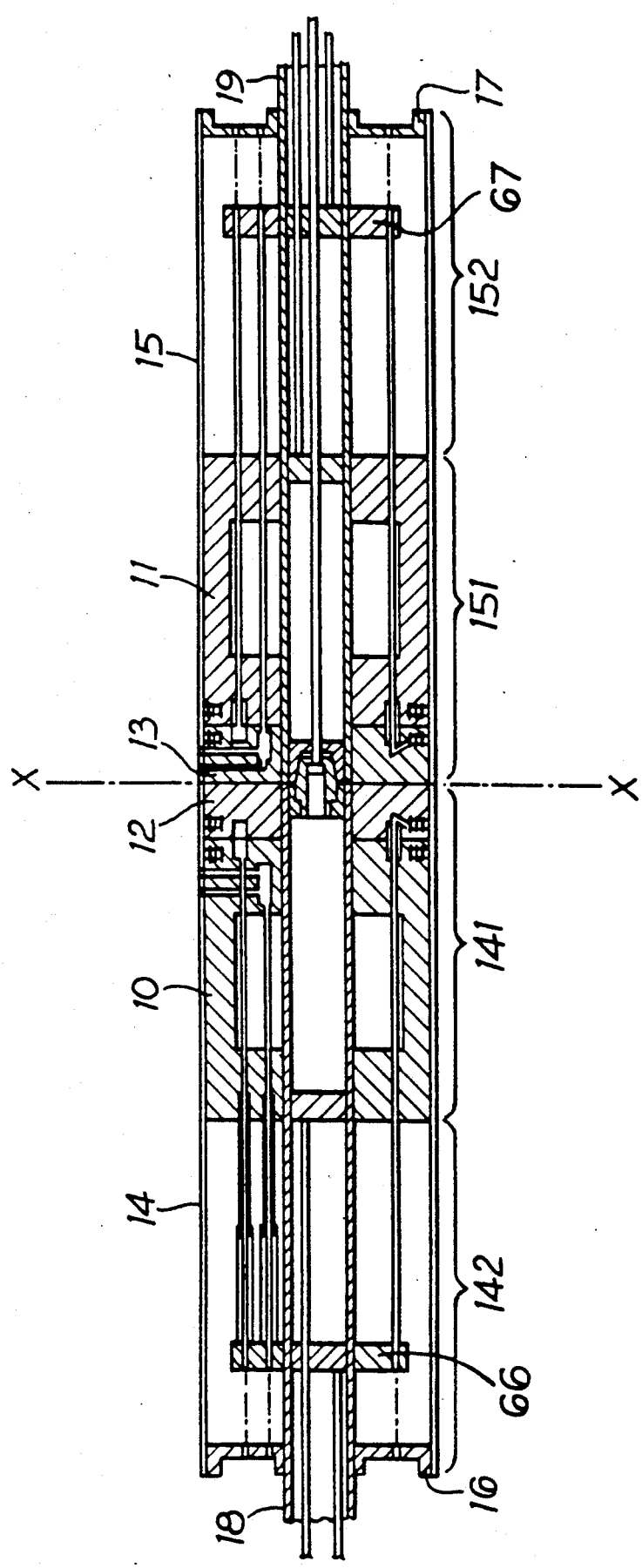

United States Patent [19]
Holroyd et al.

[11] Patent Number: 5,190,605
[45] Date of Patent: Mar. 2, 1993

[54] APPARATUS AND METHOD FOR MANUFACTURING TWO PNEUMATIC TIRES

[75] Inventors: Eric Holroyd, Knutsford; Anthony R. Wright, Southport, both of United Kingdom

[73] Assignee: Bridgestone/Firestone Inc., Akron, Ohio

[21] Appl. No.: 762,810

[22] Filed: Sep. 20, 1991

Related U.S. Application Data

[63] Continuation of Ser. No. 474,125, May 1, 1990, abandoned.

[30] Foreign Application Priority Data

Nov. 13, 1987 [GB] United Kingdom ............... 8726624

[51] Int. Cl.5 .................................................. B29D 30/24
[52] U.S. Cl. ............................ 156/128.1; 156/110.1; 156/123; 156/133; 156/398; 156/415; 156/416
[58] Field of Search ............... 156/414, 415, 416–420, 156/421.2, 398, 396, 394.1, 123, 130, 132, 133, 128.1, 110.1

[56] References Cited

U.S. PATENT DOCUMENTS 3,862,871 1/1975 Held et al. .
4,190,482 2/1980 Yabe ............................. 156/414 X
4,243,451 1/1981 Kortman ....................... 156/133 X
4,685,992 8/1987 Irie .
4,753,707 6/1988 Crombie ........................... 156/396

FOREIGN PATENT DOCUMENTS 2917219 11/1980 Fed. Rep. of Germany .
2448429 9/1980 France .
2179307 3/1987 United Kingdom .

Primary Examiner—Geoffrey L. Knable
Attorney, Agent, or Firm—Sughrue, Mion, Zinn, Macpeak & Seas

[57] ABSTRACT

Apparatus comprising a former used in the manufacture of tires. Two green covers (52, 53) devoid of sidewalls for pneumatic tires are assembled and shaped side-by-side. The two covers (52, 53) may be joined together during assembly but separated during manufacture.

15 Claims, 3 Drawing Sheets

APPARATUS AND METHOD FOR MANUFACTURING TWO PNEUMATIC TIRES

This is a continuation of application Ser. No. 07/474,125 filed May 1, 1990, now abandoned.

This invention relates to an apparatus and method for manufacturing pneumatic tires.

Conventional apparatus for manufacturing a pneumatic tire comprises a cylindrical tire building former having means for shaping tire components assembled thereon at an appropriate stage to a toroidal form. The former conventionally is rotatable, includes means for supporting the various components, in particular the tire beads, and means for moving the beads toward one-another during shaping.

One conventional method of manufacturing a pneumatic tire comprises assembling various components such as inner liner, carcass ply, bead cores and apex strips in turn on the former as indicated above, shaping the carcass ply and inner liner to a toroidal form at the same time moving the bead cores towards one another. The carcass ply, on being shaped, contacts the radially inner surface of a tread package which includes for example breaker plies and tread rubber, the tread package having been assembled on a separate building former and then transferred to a position whereby the carcass ply may be expanded into it. Sidewalls are added at an appropriate stage and the complete green cover so formed placed in a tire mould where moulding and curing takes place.

A tire building former and the associated stages of the method of tire manufacture are relatively complex and therefore expensive, and it is an object of the present invention to provide an improved apparatus and method of manufacture to attempt to reduce costs.

In accordance with one aspect of the present invention a former for the manufacture of two pneumatic tires comprises two spaced-apart end discs, a centre shaft passing through the centres of and slideable within the end discs, two centre discs slideably mounted on the centre shaft and controllably movable toward or away from a centre plane mid-way between said two end discs, two cylindrical drums slideably mounted on the centre shaft, one drum being positioned between one of the centre discs and one of the end discs so that said one drum, end disc and centre disc are on the same one side of the said centre plane, and the other drum being positioned between the other centre disc and other end disc, so that said other drum, end disc and centre disc are on the other side of said centre plane, and two flexible cylindrical sleeves each mounted at each of their ends and extending between the end discs and centre discs on respective sides of the centre plane, each sleeve passing around the drums between the end discs and the centre discs.

Preferably the centre shaft comprises a hollow tube and further comprises two half-shafts detachably connected together at said centre plane. Preferably also the centre discs and/or the drums are each movable by means of a rod passing through the centre shaft.

The diameter of the end disc, drum and centre disc on each side of the centre plane are equal, but the diameters on one side of the plane may be different from the diameters on the other side of the plane, thereby enabling two tires of different bead diameter to be manufactured simultaneously. Additionally the length of the drum on one side of the centre plane may be different from the length of the drum on the other side of the plane thereby enabling two tires of different widths to be manufactured simultaneously.

According to another aspect of the present invention a method of manufacturing two pneumatic tires comprises assembling on a cylindrical former, in turn, two pairs of bead toe strips in side-by-side relationship, two inner liners each liner being associated with a respective pair of toe strips so as to extend between the strips in each pair, a single carcass ply extending around the two inner liners and the two pairs of toe strips, and two pairs of bead assemblies extending around the carcass ply, each assembly being located radially outwards of a respective toe strip, locating radially outward from the carcass ply two tread packages each package being associated with a respective pair of bead assemblies, shaping the carcass ply and two inner liners from a generally cylindrical form to the shape of two toroids, the carcass ply contacting and adhering to the two tread packages, cutting the single carcass ply between the two toroids either before or after shaping, turning the four edges of the two parts of the carcass ply so formed around the four bead assemblies, one edge per assembly, and removing the two toroidal green covers devoid of sidewalls so formed from the former.

Preferably the shaping of the carcass ply to form two toriods is effected by introducing air under pressure radially inwards of each inner liner and facilitated by simultaneously moving the bead assemblies in each pair towards one another.

Sidewalls in the form of layers of rubber may be premoulded and applied to the green covers either before or after they have been removed from the former. The green covers either with or without sidewalls may be removed from the former by separating the former into two parts and moving the covers through the gap so formed between the parts.

One embodiment of the invention will now be described, by way of example only, with reference to the accompanying diagrammatic drawings, in which:

FIG. 1 is a longitudinal cross-section through a former in accordance with the invention, and FIGS. 2-9 are partial longitudinal cross-sections through the former of FIG. 1 at various stages of tire manufacture.

For reasons of clarity a variety of cross-sections has been incorporated in FIG. 1, but various parts and/or reference numerals have been omitted but appear in other Figures.

FIG. 1 shows a former in accordance with the invention in its initial state at the start of the manufacturing sequence. The former comprises two centre discs 12, 13 abutting each other on either side of a centre plane X—X. Abutting each centre disc are two cylindrical drums 10, 11 which, together with each centre disc, create two right cylinders. Two cylindrical sleeves 14, 15 are each positioned around each drum 10, 11 the drums being capable of moving freely inside the sleeves. The sleeves are secured at their edges close to the centre plane X—X to the respective centre discs 12, 13 and at their other edges to end discs 16, 17, respectively. The sleeves are made from flexible but inextensible material, e.g. canvas, in the areas 141, 151 around the drums 10, 11 and centre discs 12, 13 and from flexible and extensible material, e.g. rubber, in the areas 142, 152 beyond the drums 10, 11.

The centre discs, drums and end discs are mounted on two tubular half-shafts 18, 19 which are detachably connected together at the centre plane X—X. The former is capable of rotating around the longititinal axis of the two half-shafts.

Pneumatic and electrical connections (not shown) are provided at both ends of the former by, for example, rotary air joints and electrical slip rings at the end discs 16, 17. Flexible connections are used to join the end discs 16, 17 to sliding rings 66, 67 (see FIGS. 6 and 7) for subsequent distribution to the appropriate parts of the former.

Other parts of the former will be described in the following description of the various stages of manufacture of two tires particularly illustrated in FIGS. 2-9. In the first stage shown in FIG. 2 four toe strips of rubber 20, 21, 22, 23 are wound on to the sleeves 14, 15 so as to be located radially outward of the two centre discs 12, 13 and of the two drums 10, 11 adjacent their edges further from the centre plane X—X.

Figure 3:
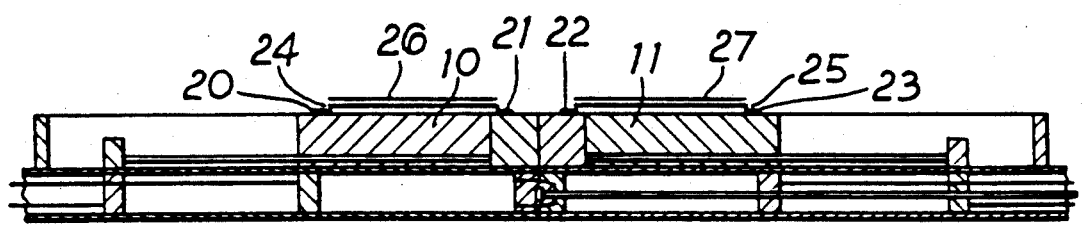

In the second stage, shown in FIG. 3, two first layers of inner liner 24, 25 and two second layers of inner liner 26, 27 are laid on the former so as to extend around the two drums 10, 11 and between the toe strips.

Figure 4:
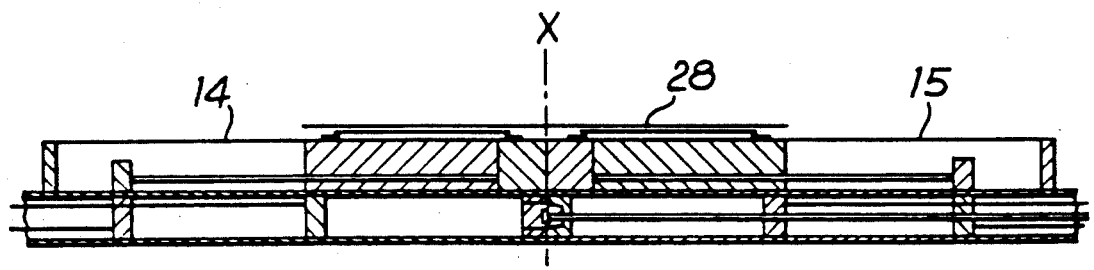

In the third stage, shown in FIG. 4, a single carcass ply 28 is applied radially outward of the two inner liners, now shown as single layers. The carcass ply 28 is arranged symmetrically with respect to the centre plane X—X. Up to this stage all the components have been applied on what is effectively a right cylinder which provides full support for the sleeves 14, 15 and the components assembled thereon.

Figure 5:
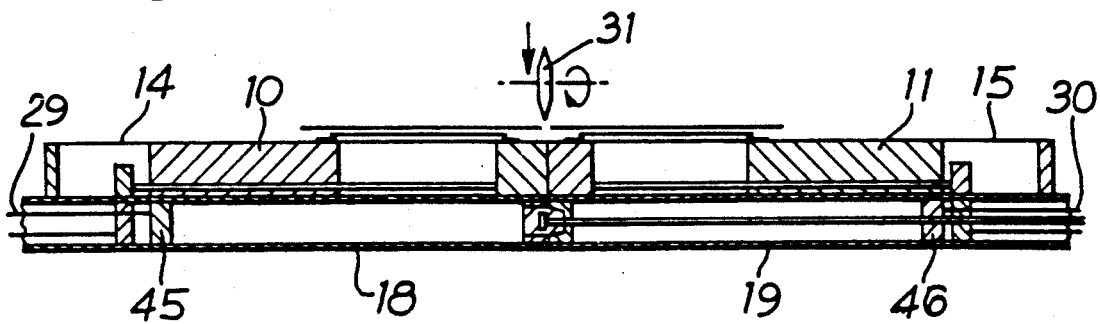

In the next stage the drums 10, 11 are moved axially outward with respect to the centre plane X—X to the position shown in FIG. 5 by suitable means (not shown) acting on rods 29, 30 located within the two half-shafts 18, 19. The rods 29, 30 are connected to drums 10, 11 respectively by sliders 45, 46 moving in longitudinal slots (not shown) in the half-shafts 18, 19. The carcass ply 28, which comprises rubberised cord fabric, having cords which extend longitudinally of the formers, assists in maintaining the other components in position on the two sleeves 14, 15 relative to the centre plane X—X. The movement of the drums also tends to tension the carcass ply 28. When the former is in the position shown in FIG. 5 it is rotated and a cutting disc 31 brought into contact with the carcass ply 28 at the centre plane X—X to cut it into two parts. However the cutting of the carcass ply may be delayed until a later stage.

Figure 6:
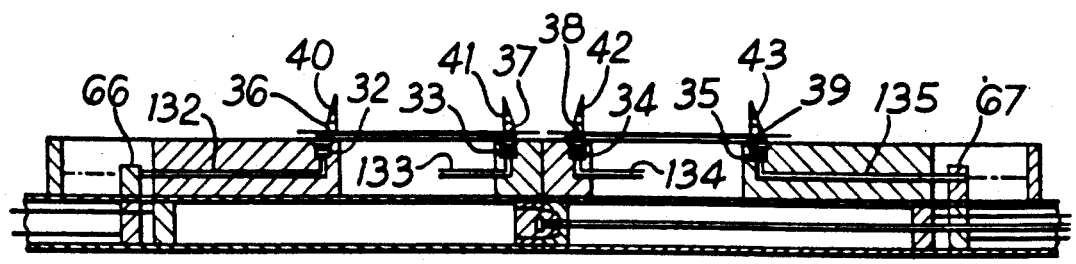

In the next stage, shown in FIG. 6, four sets of electromagnets 32, 33, 34, 35 located in the two centre discs and in the drums adjacent the edges closest to the centre plane X—X are energised and bead core assemblies 36, 37, 38, 39 wound on to the former (which is rotated as necessary) immediately radially outwards of the sets of electromagnets, respectively. Each set of electromagnets comprises a plurality of individual electromagnets equally spaced around the circumferences of the drums and the centre discs. The electric wires for carrying electric current to the electromagnet sets 32, 35 in the drums 10, 11 are run through rigid tubes 132, 135 to rings 66, 67 respectively and through flexible tubes to end discs 16, 17 respectively. The electric wires for carrying electric current to the electromagnet sets 33, 34 are run through rigid tubes 133, 134 (only partially shown in FIG. 6) to drums 10, 11. The wires are supported by telescopic tubes between drums 10, 11 and rings 66, 67 respectively and then through flexible tubes to end discs 16, 17. A conventional type of slip ring connector may be used to transmit electric power to the rotatable end discs 16, 17 from an external source.

The electromagnet sets are used initially to locate the bead cores in position on the former during winding but they are also used during later stages to assist in preventing displacement. It will be appreciated that the diameter of the former drums and discs and the thicknesses of the sleeves and tire components assembled thereon will be such that the resultant total diameter on which the bead core is wound results in a predetermined inner diameter of the bead core. The cores are preferably of steel wire insulated in rubber. Bead apices 40, 41, 42, 43 are wound radially outward of the bead cores 36, 37, 38, 39 respectively. Additional support may be provided to prevent movement of the bead cores and apices during the later stages of tire manufacture, in the form of four sets of radially expanding supports radially inward of the positions where the toe strips 20, 21, 22, 23 were applied on the centre discs and drums. The carcass ply 28, if not already cut, may be cut at this stage after application of the bead apices.

Figure 7:
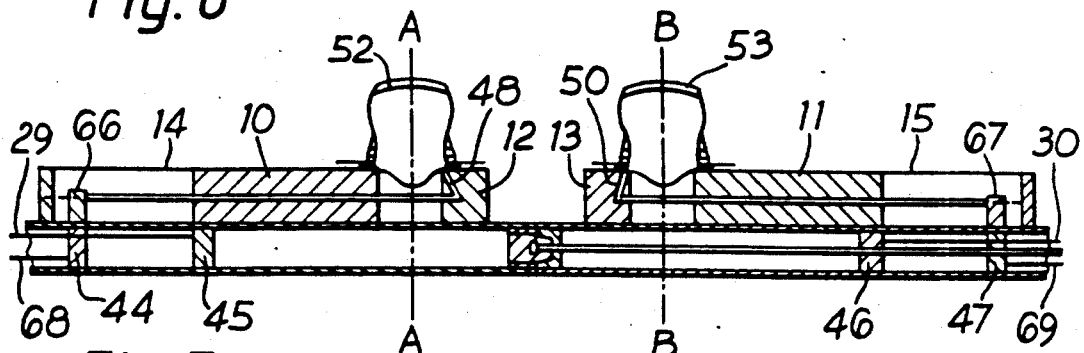

In the next stage, shown in FIG. 7, the two parts of the carcass ply are shaped. The rods 29, 30 are moved to push the drums 10, 11 respectively toward the centre plane X—X while the centre discs 12, 13 are moved away from the centre plane by an equal distance. The movement of the centre discs is effected by moving rods 68, 69 connected to sliders 44, 47 attached to rings 66, 67 via longitudinal slots in the half-shafts 18, 19. The air and electric wire support tubes 133, 134 connecting the rings 66, 67 to the centre discs 12, 13 also serve as rigid connections to transmit motion between the centre discs and the rings. As a result one drum 10 and the associated centre disc 12 both on the same side of the centre plane X—X move toward one another at an equal and controlled rate with respect to a plane A—A midway between the toe strips 20, 21 originally applied. An identical motion occurs on the other side of the centre plane X—X, the other centre disc 13 and other drum 11 both moving toward one another with respect to a plane B—B midway between the toe strips 22, 23 originally applied, at the same equal and controlled rate.

Simultaneously with the motion of the centre discs 12, 13 and the drums 10, 11 a variable and controlled air pressure is applied through a plurality of air holes 48, 50 equally spaced apart around the circumference of the centre discs 12, 13 respectively via holes in the sleeves 14, 15 thus causing inflation of the two parts of the carcass ply 28. The rate of inflation is controlled by monitoring air pressure within the two parts of the carcass ply via single orifices (not shown) in discs 12, 13. The orifices are separate from the inflation holes 48, 50. The air holes 48, 50 and orifices are connected via rigid tubes to rings 66, 67 as previously described. The sleeves 14, 15 each act as an air seal to the inner parts of the former while the bead cores by virtue of the fact that they have been wound on the other rubber components form an air-tight seal between the carcass ply and the respective sleeve.

The shaping of the two parts of the carcass ply takes place within two tread carrying rings (not shown) each containing a tread package 52, 53 comprising at least tread rubber and breakers and each positioned symmetrically with respect to the planes A—A and B—B respectively.

Figure 8:
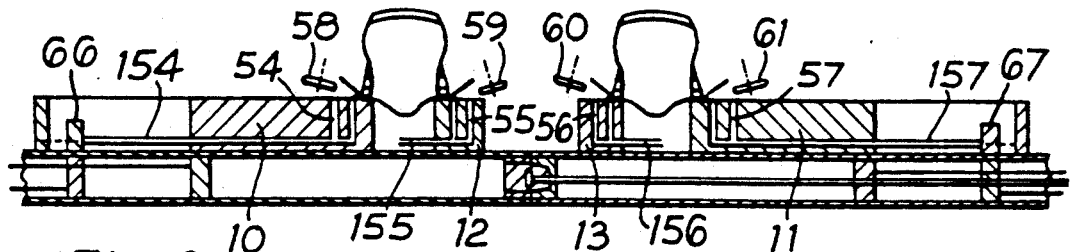

In the next stage shown in FIG. 8 the edges of the two parts of the carcass ply are turned up around the respective bead cores. The whole former, with the carcasses and treads thereon, is rotated while air pressure is maintained within the toroidally shaped carcasses. A plurality of radially oriented holes paired in four sets 54, 55, 56, 57 in the drums 10, 11 and centre discs 12, 13 pass air to lift the edges away from the sleeves while the whole assembly rotates. Air is supplied to the hole sets 54, 55, 56, 57 via a set of pipes 154, 155, 156, 157 connected to the rings 66, 67 in a similar manner to the rigid tubes through which inflationary air is passed. Four conventional types of spinner arrangements 58, 59, 60, 61 are then brought into operation to turn up the ply edges.

Figure 9:
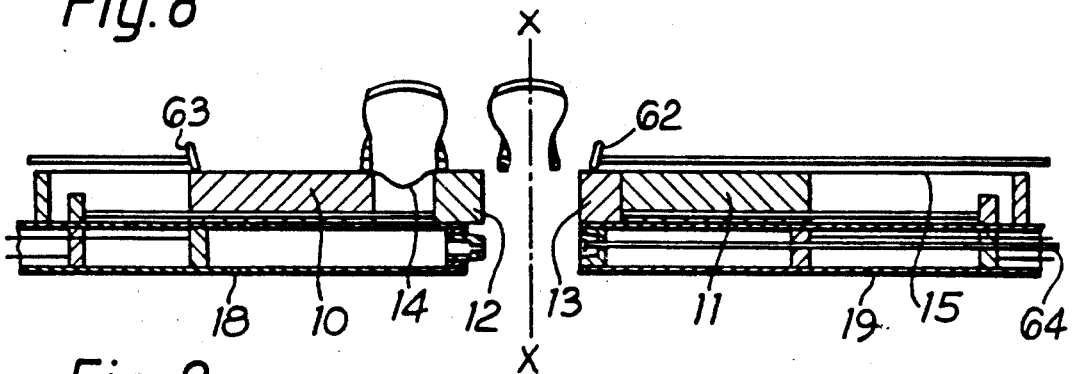

In the final stage, shown in FIG. 9, the two green covers, devoid of sidewall rubber, so formed are removed from the former. A rod 64 located centrally within one half-shaft 19 is rotated to unlock a bayonet type fitting connecting the two half-shafts 18, 19 together. The two half-shafts are then separated by pulling them axially apart until their inner ends coincide with centre discs 12, 13. The electromagnet sets 32, 33, 34, 35 are de-energised and the inflation pressure released.

Considering one side only of the former, one drum 11 is moved toward the centre plane X—X until it abuts centre disc 13. A ring 62 around the sleeve 15 is simultaneously moved axially toward the centre plane X—X and pushes the green cover, devoid of sidewalls, toward the gap formed between the two centre discs 12, 13. The cover is removed through this gap. The movements of the ring 62 and drum 11 are sequenced so that the tire bead is partially released from the drum before the drum 11 abuts centre disc 13. This enables the extensible part 152 of the sleeve 15, which is fully extended at this stage, to pull the nonextensible part 151 of the sleeve clear before the drum 11 abuts the centre disc 13. The green cover is taken away supported in the tread carrying ring.

The removal of the second green cover from the other side of the centre plane X—X is carried out in a similar manner using a second ring 63. Sidewalls, which may be premoulded, may be fitted to the green covers so formed in a separate operation before being moulded and cured to form complete tires.

To complete the cycle of operation of the former, the two parts of the former are rejoined. The two half-shafts 18, 19 are moved toward one another until their ends meet at the centre plane X—X. The centrally located rod 64 is rotated to lock the bayonet type fitting. It is important to ensure that both parts of the former are accurately aligned and rotate concentrically about the longitudinal axis, whilst there is no deflection along the axis. These effects are minimised by means of a tapered plug unit at the connection between the two half-shafts 18, 19 and the bayonet-type fitting referred to above.

Figure 2:
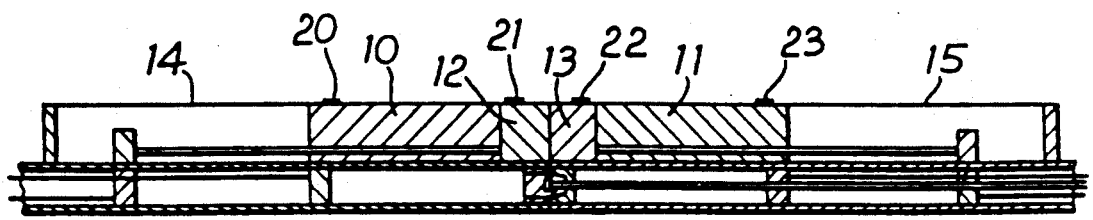

The drum 10 and centre disc 12, and other drum 11 and other centre disc 13, are then moved toward centre plane X—X until they are all in abutting relationship as shown in FIGS. 1 and 2.

The description above refers to the manufacture of two tires simultaneously. However it is possible to use the two parts of the former separately.

It is to be appreciated that other tire components, e.g. chafer strips may additionally be incorporated in the tires being manufactured.

We claim:

1. A method of manufacturing two pneumatic tires comprising providing a cylindrical former including a coaxial arrangement of two center discs, two end discs, and two drums each disposed between a center disc and a respective end disc, assembling on said former two pairs of bead toe strips in side-by-side relationship; one of the toe strips in each pair being located radially outwards of the respective center disc and the other toe strip in each pair being located radially outwards of the respective drum, two inner liners each liner being associated with a respective pair of toe strips so as to extend between the strips in each pair, a single carcass ply extending around the two inner liners and the two pairs of toe strips, and two pairs of bead assemblies extending around the carcass ply, each assembly being located radially outwards of a respective toe strip, locating radially outward from the carcass ply two tread packages each package being associated with a respective pair of bead assemblies, cutting the single carcass ply between the two toroids, then shaping the carcass ply and two inner liners from a generally cylindrical form to the shape of two toroids by means of movement of the drums and their respective center discs towards one another, the carcass ply contacting and adhering to the two tread packages, turning the four edges of the two parts of the carcass ply so formed around the four bead assemblies, one edge per assembly, and removing the two toroidal green covers so formed from the former.

2. A method as claimed in claim 1, wherein the shaping of the carcass ply (28) to form two toroids is effected by introducing air under pressure radially inward of the inner liners 3. A method as claimed in claim 1, further comprising the step of applying sidewalls in the form of layers of rubber to the green covers before removal from the former.

4. A method as claimed in claim 1, further comprising the steps of premoulding sidewalls in the form of layers of rubber and applying them to the green covers.

5. A method as claimed in claim 1 further comprising the step of separating the former into two parts and removing the green covers through the gap formed between the parts.

6. A former for the manufacture of two pneumatic tires comprising two spaced-apart end discs, a center shaft passing through the centers of and slideable within the end discs, two center discs slidably mounted on the center shaft and controllably movable toward or away from a center plane mid-way between said two end discs, the center discs being in contact with each other when adjacent the center plane, one disc on each side thereof, two cylindrical drums slidably mounted on the center shaft, one drum being positioned between one of the center discs and one of the end discs so that said one drum, end disc and center disc are on the same one side of the said center plane, and the other drum being positioned between the other center disc and other end disc so that said other drum, end disc and center disc are on the other side of said center plane, and two flexible cylindrical sleeves each mounted at each of their ends and extending between the end discs and center discs on respective sides of the center plane, each sleeve passing around the drums between the end discs and the center discs, a portion of each cylindrical sleeve which is around a respective drum when the latter is in contact with its respective adjacent center disc being flexible but substantially inextensible and the remaining portion of each cylindrical sleeve being flexible and extensible.

7. A former as claimed in claim 6 wherein the center shaft comprises a hollow tube.

8. A former as claimed in claim 6 wherein the center shaft comprises two half-shafts detachably connected together at said center plane.

9. A former as claimed in claim 6 the center discs are each movable by means of a rod.

10. A former as claimed in claim 6 wherein the drums are each movable by means of a rod.

11. A former as claimed in claim 6 wherein the diameters of the end disc, drum and center disc on each side of the center plane are equal but different from the diameters of the end disc, drum and center disc on the other side of the center plane.

12. A former as claimed in claim 6 wherein the length of the one drum on one side of the center plane is different from the length of the one drum on the other side of the center plane.

13. A former as claimed in claim 6 and comprising electromagnetic means on both of the drums and center discs for locating bead cores during manufacture of the tires.

14. A former as claimed in claim 6 and comprising support means for preventing axial movement of bead cores during manufacture of the tires.

15. A former as claimed in claim 6 and comprising air pressurising means for shaping the tires during manufacture.

* * * * *